UNITED STATES PATENT OFFICE.

JOSEPH MAXWELL CARRERÉ, OF ALLENTOWN, PENNSYLVANIA, ASSIGNOR TO BLANC STAINLESS CEMENT COMPANY, OF ALLENTOWN, PENNSYLVANIA, A CORPORATION OF NEW JERSEY.

PROCESS OF MAKING HYDRAULIC CEMENT.

953,258.     Specification of Letters Patent.     Patented Mar. 29, 1910.

No Drawing.     Application filed May 10, 1907. Serial No. 372,918.

*To all whom it may concern:*

Be it known that I, JOSEPH MAXWELL CARRERÉ, a citizen of the United States, residing at Allentown, Lehigh county, Pennsylvania, have invented certain new and useful Improvements in Processes of Making Hydraulic Cement, of which the following is a full, clear, and exact description.

My invention relates to the manufacture of hydraulic cement, and has for its object to produce a cement by means of comparatively low degree of heat, and which shall be white or light in color. I do this by forming a mixture of two materials found in nature, namely, a peculiar alkaline clay and limestone, the said ingredients being substantially free from iron or other coloring matter, burning the same to a clinker, and pulverizing.

In making the cement, I first form a mixture containing about 23% of silica ($Si.O_2$), 9% of alumina ($Al_2O_3$), 2 to 3% of an alkali such as potassium oxid ($K_2O$) and 64% of calcium oxid, all being substantially free from iron and other fixed coloring matter, and the first three elements constituting a natural alkaline clay. This mixture is then thoroughly ground up, wet or dry, to a pulverulent mass or powder so as to insure a thorough intermingling of the ingredients and provide a uniform mix. This mixture I place in a suitable kiln or furnace, such as are now ordinarily used in the manufacture of hydraulic cement, and subject it to heat supplied in any of the well-known ways so as to reduce it to a clinker. I then pulverize the clinker, and if necessary to regulate the set, add gypsum or calcium sulfate in the manner well understood in the art. The potassium oxid acts as a flux to reduce the fusing point of the mixture, and the process results in a product which, when used in the ordinary way, produces a firm and substantially white cement which will not disintegrate.

Of the ingredients above referred to, the first three are found in some localities in a state of nature to exist intermingled in substantially the proportions specified and forming what may be known as an alkaline clay, substantially free from iron. When found in the state of nature there may be in the mixture some iron and other impurities, such as oxid of magnesia ($Mg.O$) and sulfurous oxid ($SO_2$). There may also be some sodium oxid ($Na_2O$). The sodium oxid is an alkali and itself acts as a flux. While not as useful as the potassium oxid it is useful in reducing the melting point of the mixture. The impurities above specified, other than the iron, when in small quantity do not seriously impair the product. The iron, however, should be so small in amount that the clay may be said to be substantially free from iron.

Heretofore, clays rich in alkalies such as these referred to above have been regarded as utterly useless for cement making or for use in connection with the manufacture of china and porcelain, and had it not been for a long series of experiments carried out by me in connection with the materials separately obtained and the results produced thereby, I should not have supposed that the manufacture of cement from clay of the character described could produce a commercial product. I have discovered that the amount of potassium oxid may be slightly greater or slightly less without impairing the result. Thus if the potassium oxid is as low as one per cent. (1%) or as high as four per cent. (4%), good results may still be obtained. I prefer, however, to use substantially the proportions first mentioned.

What I claim is:

The process of manufacturing cement, consisting in preparing a mixture of limestone and a natural alkaline clay, the clay being rich in potassium compounds, the mixture corresponding approximately to silica twenty-three per cent., alumina nine per cent., potassium oxid about three per cent., and calcium oxid sixty-four per cent., and being substantially free from iron, burning the mixture so as to produce a clinkered product, and pulverizing said product.

JOSEPH MAXWELL CARRERÉ.

Witnesses:
   H. B. BROWNELL,
   L. S. JAMES.